United States Patent [19]

Wakalopulos et al.

[11] Patent Number: 4,749,911

[45] Date of Patent: Jun. 7, 1988

[54] ION PLASMA ELECTRON GUN WITH DOSE RATE CONTROL VIA AMPLITUDE MODULATION OF THE PLASMA DISCHARGE

[75] Inventors: George Wakalopulos, Danville; Sherman R. Farrell, Orinda, both of Calif.

[73] Assignee: RPC Industries, Hayward, Calif.

[21] Appl. No.: 31,619

[22] Filed: Mar. 30, 1987

[51] Int. Cl.[4] .............................................. H02K 39/00
[52] U.S. Cl. ......................... 315/111.21; 315/111.91; 315/111.31; 315/111.81; 250/423 R
[58] Field of Search ................ 315/39, 111.41, 111.81, 315/111.21, 111.91, 111.31; 313/363.1, 364, 362.1; 250/423 R

[56] References Cited

U.S. PATENT DOCUMENTS

| | | | |
|---|---|---|---|
| 2,738,439 | 3/1956 | Hornbuckle | 313/364 |
| 3,010,017 | 11/1961 | Brubaker et al. | 313/363.1 |
| 3,243,570 | 3/1966 | Boring | 315/111.2 |
| 3,411,035 | 11/1968 | Necker | 315/111.2 |
| 3,866,089 | 2/1975 | Hengartner | 315/111.2 |
| 3,903,891 | 9/1975 | Brayshaw | |
| 3,970,892 | 7/1976 | Wakalopulos | 315/111.3 |
| 4,061,944 | 12/1977 | Gay | 313/420 |
| 4,288,716 | 9/1981 | Hinkel et al. | 315/111.81 |
| 4,298,817 | 11/1981 | Carette et al. | 313/363.1 |
| 4,359,667 | 11/1982 | Paterson et al. | 313/348 |
| 4,453,078 | 6/1984 | Shimizu | 315/111.81 |
| 4,574,179 | 3/1986 | Masuzawa et al. | 315/111.31 |
| 4,598,231 | 7/1986 | Matsuda et al. | 313/363.1 |
| 4,628,227 | 12/1986 | Briere | 315/111.81 |
| 4,645,978 | 2/1987 | Harvey et al. | 315/111.81 |
| 4,684,848 | 8/1987 | Kaufman et al. | 315/111.81 |
| 4,694,222 | 9/1987 | Wakalopulos | 315/111.21 |

OTHER PUBLICATIONS

Zakharchenko et al., "A Stabilization Unit For A Cold Cathode Glow Discharge Electron-Beam Gun", Art. Svarka, vol. 28, No. 12, pp. 56-58, (Dec. 1975).
Bayless et al., "The Plasma-Cathode Electron Gun", IEEE Journal Quantum Electronics, vol. QE-10, No. 2, pp. 213-218, (Feb. 1974).
Wakalopulos et al., "Wire-Ion-Plasma (WIP): A Revolutionary New Technology For E-Beam Curing", Society of Manufacturing Engineers, technical paper, pp. 1-17, (1983).

Primary Examiner—David K. Moore
Assistant Examiner—Michael Razavi
Attorney, Agent, or Firm—Malcolm B. Wittenberg

[57] ABSTRACT

An ion plasma electron gun for the generation of large area electron beams with uniform electron distribution. Positive ions generated by a wire in a plasma discharge chamber are accelerated through an extraction grid into a second chamber containing a high voltage cold cathode. These positive ions bombard a surface of the cathode causing the cathode to emit secondary electrons which form an electron beam. After passage through an extraction grid and plasma discharge chamber, the electron beam exits from the gun by way of a second grid and a foil window supported on the second grid. The gun is constructed so that the electron beam passing through the foil window has a relatively large area and uniform electron distribution which is substantially the same as the ion distribution of the ion beam impinging upon the cathode. A target and comparison circuit are functionally connected to a current control power supply for the positive ion source which in combination are capable of maintaining the output of secondary electrons emitting from the foil window substantially constant.

1 Claim, 2 Drawing Sheets

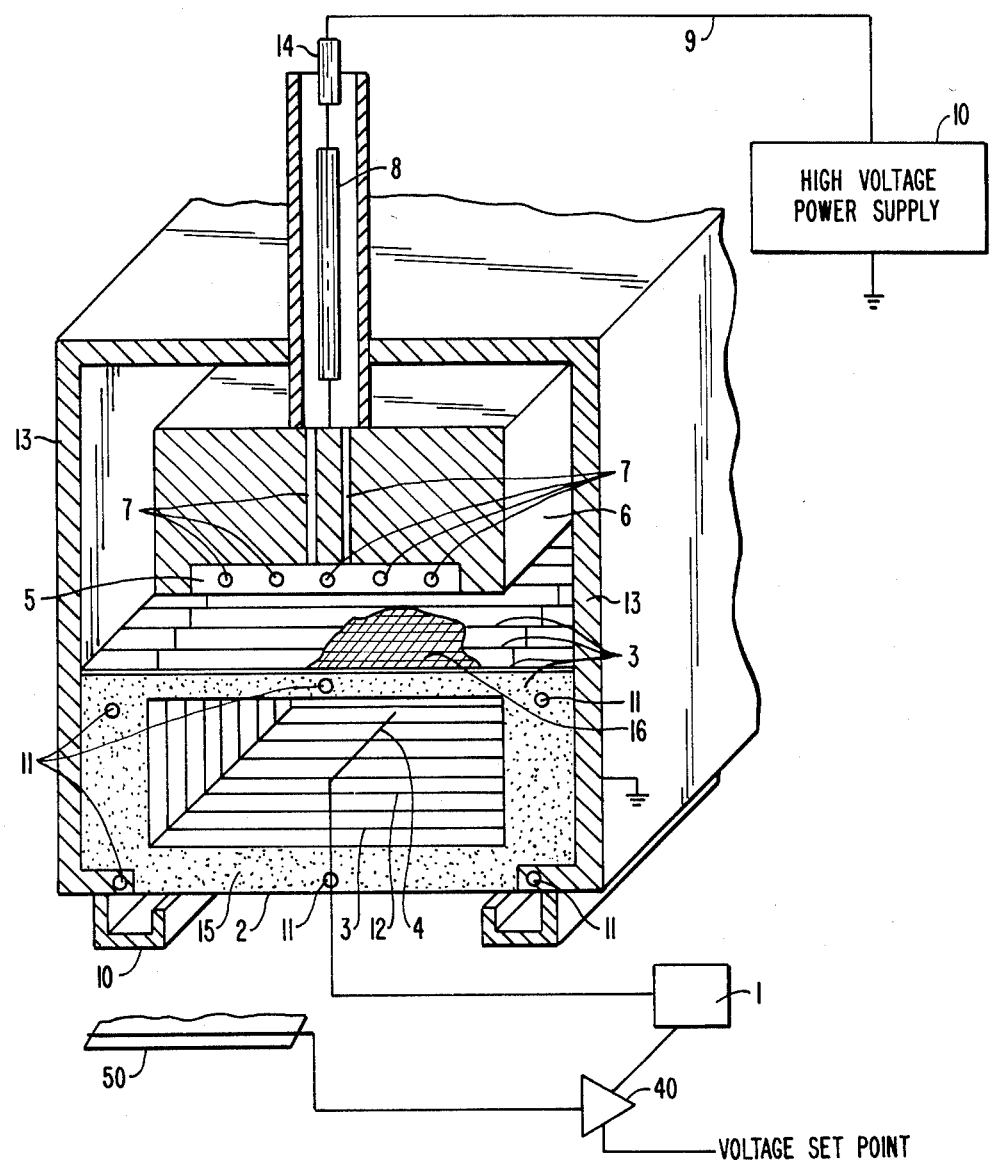
FIG._1.

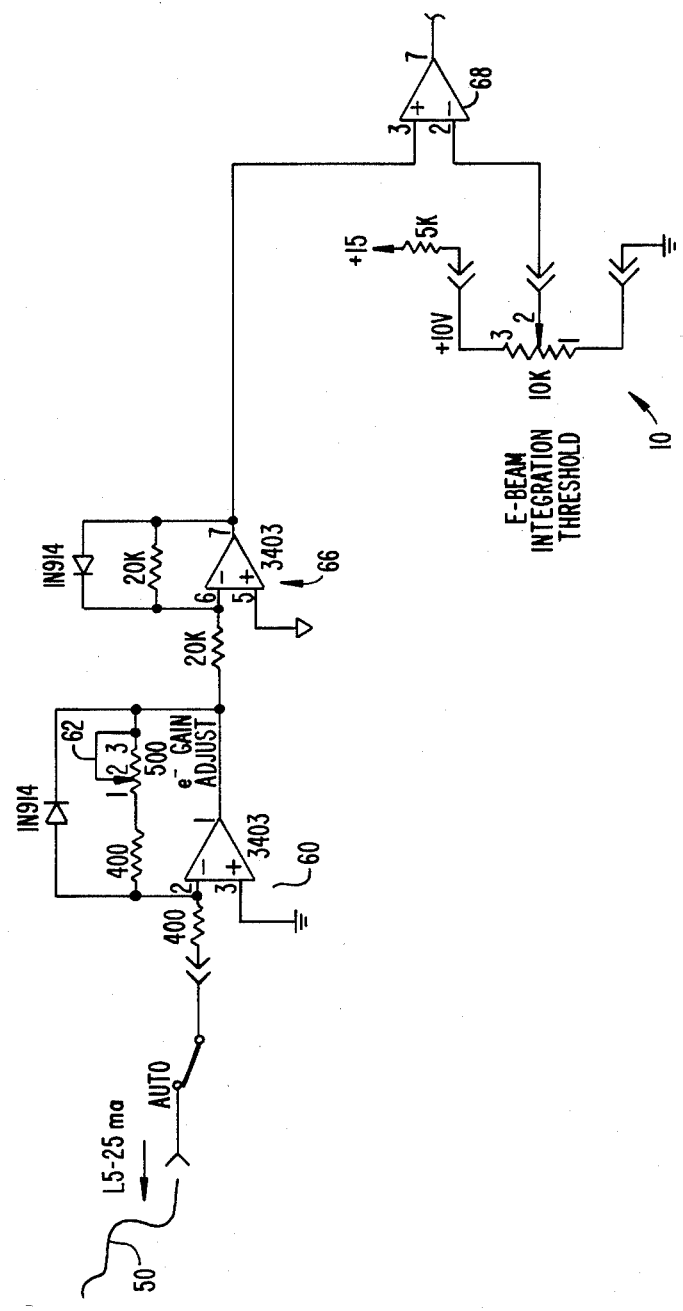
FIG._2.

ION PLASMA ELECTRON GUN WITH DOSE RATE CONTROL VIA AMPLITUDE MODULATION OF THE PLASMA DISCHARGE

BACKGROUND OF THE INVENTION

The ion plasma electron gun of the present invention is of the same general type as the gun disclosed in U.S. Pat. No. 3,970,892 and U.S. Pat. application Ser. No. 596,093. As stated in the prior art, a recent advance in the art of generating high energy electron beams for use, for example, in e-beam excited gas lasers, is the plasma cathode electron gun. In such an electron gun, a plasma is produced in a hollow cathode discharge between the hollow cathode surface and an anode grid operated at a relatively low voltage with respect to the cathode. Electrons are extracted from the discharge plasma through the anode grid and a control grid, and these electrons are accelerated to high energies in a plasma-free region between the grids and an accelerating anode which, typically, is a thin foil window maintained at a relatively high voltage with respect to the cathode. Among the advantages of the plasma cathode electron gun are its structural simplicity and ruggedness, high controllability and efficiency, low cost, and suitability for producing large area electron beams. A second patent, namely, U.S. Pat. No. 4,025,818, discloses an ion plasma electron gun which is essentially similar to the gun described above with the addition of a wire anode for the plasma discharge and a number of baffles which allow the plasma chambers to be connected sequentially. In prior electron beam generators, the beam current is generally proportional to the current provided to the cathode by the high voltage power supply. Thus, controlling and maintaining a uniform and constant dose rate is simply a question of measuring and controlling the current supplied to the cathode.

In the case of wire ion plasma devices, however, the high voltage power supply current is the sum of incident helium ions generated in the plasma chamber and the electrons emitted from the cathode surface. The ratio of emitted electrons to incident ions, the secondary emission coefficient, is dependent upon the surface conditions on the emitter surface. These conditions have been found to be quite changeable, so that the mere monitoring of the high voltage power supply current is inadequate for controlling and maintaining constant the dose rate or secondary electron output of the wire ion plasma device.

It is thus an object of the present invention to provide a means for accurately controlling and maintaining constant the dose rate or secondary electron beam output of a wire ion plasma electron gun.

This and further objects of the present invention will be more readily perceived when considering the following disclosure and appended drawings, wherein:

FIG. 1 is a perspective view, partially in section, illustrating the basic components of the ion plasma electron gun of the present invention.

FIG. 2 is a schematic of comparison circuitry used in the present invention.

SUMMARY OF THE INVENTION

The present invention is of an ion plasma electron gun assembly. The assembly comprises an electrically conductive evacuated housing forming first and second chambers adjacent to one another and having an opening therebetween. A wire is located in the first chamber which is electrically connected to a current-regulated power supply for generating positive ions, such as helium ions, in said first chamber. A cathode positioned in the second chamber is in a spaced and insulated relationship from the housing. The cathode is provided with a secondary electron-emissive surface.

Means are provided for applying a high negative voltage between the cathode and the housing to cause the cathode to draw positive ions from the first chamber to the second chamber to impinge upon the surface of the cathode and to cause the surface to emit secondary electrons. An electrically conductive electron transmissive foil extends over an opening in the housing at the end of the first chamber facing the cathode. The foil is electrically connected to the housing to constitute an anode for the secondary electrons, causing them to pass through the foil as an electron beam.

An electrically conductive extractor grid is mounted in the second chamber adjacent to the secondary electron emissive surface of the cathode and is connected to the housing to create an electrostatic field at the secondary electron emissive surface to cause secondary electrons to pass through the openings of the grid and into the first chamber. An electrically conductive support grid is mounted in the first chamber adjacent to the foil and is connected to the foil and to the housing which serves to support the foil. The support grid is provided with openings which are generally aligned with the openings in the extractor grid to act in conjunction with the extractor grid to accelerate secondary electrons to the foil.

The ion plasma electron gun of the present invention is further provided with a target surface which is intended to be struck by the secondary electrons as they emanate from the foil window or pass through the plasma chamber. The target is capable of developing a voltage when struck by the secondary electrons. The target is connected to a comparison circuit while the comparison circuit is connected in turn to the current regulated power supply. The combination of target, comparison circuit and power supply are capable of maintaining the output of the secondary electrons emanating from the foil window substantially constant.

DETAILED DESCRIPTION OF THE INVENTION

FIG. 1 illustrates the basic components of a plasma electron gun constructed in accordance with the present invention. The gun includes an electrically-conductive grounded enclosure which is composed of a high voltage chamber 13, an ion plasma discharge chamber 12, and an electron-transmissive foil window 2. A wire 4 extends through plasma discharge chamber 12. The foil window is electrically connected to the grounded enclosure, and it forms an anode which causes electrons to be accelerated to and through it. The enclosure is filled with 1 to 10 milli-torr of helium. A cathode 6 is positioned in the high voltage chamber 13 and insulated therefrom. An insert 5 for the cathode is mounted on its lower surface. The insert 5 is typically molybdenum, but can be of any material with a high electron emission coefficient. The high voltage cathode is uniformly spaced from the enclosure to prevent Paschen breakdown.

A high voltage power supply 10 supplies a high negative potential of 150 to 300 kv to cathode 6 through cable 9, which extends through an epoxy insulator 14, to a resistor 8 which is interposed between the cable 9 and the cathode 6. The cathode 6 and insert 5 are cooled by an appropriate cooling liquid, such as oil, which is pumped through conduit 7.

The plasma chamber 12 contains a number of metallic ribs which are mechanically and electrically connected together. The ribs 3 contain cut-outs in the center to allow wire 4 to pass through the entire structure. The sides of the ribs 3 facing the cathode 6 form an extraction grid 16, while the opposite side of the ribs form a support grid 15 for supporting the electron transmissive foil window 2. In lieu of the ribs, anode plates having a multiplicity of holes can be employed. Liquid cooling channels 8 provide for heat removal from the plasma chamber.

The electron transmissive window 2 may be composed of a one-quarter to one mil thick titanium or aluminum foil, which is supported by the support grid 15 and sealed to the enclosure by an O-ring. A gas manifold 10 is generally used to cool the foil window with pressurized nitrogen, and to eliminate ozone from the beam area.

A current-regulated power supply is connected to wire 4. When the power supply 1 is energized, a plasma consisting of helium ions and electrons is established in plasma chamber 12 by the electrical field surrounding wire 4. Once the plasma is established, the positive helium ions in the plasma are extracted from the plasma chamber by the high voltage electric field leaking through the extractor electrode 16. The positive helium ions generated in the plasma are extracted to cathode 6 by the field that leaks through the extraction grid 16 into the plasma chamber. This field can vary in strength from a few hundred volts up to 10,000 volts. The ions flow along the field lines through the extraction grid 16 into the high voltage chamber 13. Here they are accelerated across the full potential and bombard the cathode insert 5 as a collimated beam. The secondary electrons emitted by the cathode insert have a slight spacial spread due to the cosine distribution of their emission direction.

As previously noted, when dealing with a wire ion plasma electron gun, the dose rate or secondary electron output from the gun is not necessarily directly proportional to the current supplied by high-voltage power supply 10. In devices of this type, the high voltage power supply current is the sum of incident helium ions and emitted electrons. The ratio of emitted electrons to incident ions, the secondary emission coefficient, is dependent upon surface conditions of the emitter surface. These conditions are oftentimes changeable, and thus simply monitoring the high voltage power supply is inadequate for controlling consistency in the dose rate or secondary electron output.

It has been determined that dose rate is, to a large part, a linear function of the plasma current. Thus, by monitoring the secondary electron beam and proportionately regulating the current supplied to anode wire 4 by the current regulated power supply 1 of anode wire 4 one is able to control and maintain a consistent output of secondary electrons.

The above-recited objects are accomplished by providing a metallic element 50 as a target to be struck by the secondary electron output of the gun. The target can be virtually any physical shape, such as a flat metallic plate, a paddle or wire composed of a material such as copper, which is capable of developing a voltage and conducting a current when struck by the secondary electrons.

It is contemplated that target 50 be electrically connected to a comparison circuit 40 which is capable of taking the difference between the voltage read from target 50 with a preset voltage established in the comparison circuit. Thus, when the voltage from target 50 differs from the set-point, a signal is provided to current regulated power supply 1 to adjust the plasma current such that the difference is reduced. For example, when conditions within the wire ion plasma electron gun are such as to unduly raise the dose rate or output therefrom, target 50 develops a higher voltage, which results in the comparison circuit reading a voltage above the prescribed set-point, which results in a signal being fed to current regulated power supply 1 to reduce plasma generation.

FIG. 2 provides an example of a comparison circuit which can be used in the present invention.

The voltage provided from target 50 is received by input amplifier 60, where it is amplified at a gain that is adjustable by way of potentiometer 62. Potentiometer 62 is connected in a negative feedback loop between the output and inverting input of input amplifier 60. Buffer amplifier 66 receives the signal from the output of input amplifier 60 and supplies the signal to one input of comparator 68. Comparator 68 can be a differential amplifier or the like. The other input of comparator 68 is connected to a set point voltage generator 70. As shown in FIG. 2, the set point voltage generator 70 can be a voltage divider coupled between a supply voltage and ground. The voltage divider can be implemented using a potentiometer which is adjusted by the user, for example.

The output of comparator 68 is a signal proportional to the difference between the set point voltage and the voltage from target 50. This difference signal is applied to the current regulated power supply 1, which can be a Model BHK 1000-0.2M power supply, manufactured by Kepco of Flushing, N.Y. The current regulated power supply 1 responds by adjusting the current applied to wire 4 and hence causes a change in the plasma intensity. This change is detected by target 50, and the difference signal from comparator 68 changes to reflect the change in plasma intensity. In this manner, the current applied to wire 4 is modified until the desired plasma intensity is being detected by target 50.

We claim:

1. In an ion plasma electron gun assembly comprising: an electrically conductive evacuated housing forming first and second chambers adjacent to one another and having an opening therebetween; an anode wire located in said first chamber which is electrically connected to a current regulated power supply for generating a plasma consisting of electrons and positively charged ions in said first chamber; a cathode positioned in said second chamber in spaced and insulated relationship from said housing, said cathode having a secondary electron emissive surface; means for applying a high negative voltage between said cathode and said housing to cause said cathode to draw the positive ions from said first chamber to said second chamber to impinge on said surface of said cathode and to cause said surface to emit secondary electrons; an electrically conductive electron transmissive foil extending over an opening in said housing at the end of said first chamber facing said cathode, said foil being electrically connected to the housing to constitute an anode for the secondary electrons and causing the secondary electrons to pass through the foil as an electron beam; an electrically conductive extractor grid mounted in said second chamber adjacent to the secondary electron emissive surface of said cathode and connected to said housing to create an electrostatic field at said surface to cause secondary electrons therefrom to pass through the openings in the grid and into said first chamber; and an electrically conductive support grid mounted in said first chamber adjacent to said foil and connected to said foil and to said housing, said support grid serving to support said foil and having openings therein aligned with the openings in said extractor grid to act in conjunction with said extractor grid to accelerate the secondary electrons to the foil, the improvement comprising providing a target which is capable of developing a voltage when struck by said secondary electrons to which is electrically connected a comparison circuit and to said current regulated power supply, the combination of which being capable of maintaining the output of secondary electrons emanating from the foil window substantially constant by regulating the current supplied to the anode wire by the current regulated power supply.

* * * * *